(12) United States Patent
Li et al.

(10) Patent No.: US 7,570,394 B2
(45) Date of Patent: Aug. 4, 2009

(54) SYSTEM FOR DETERMINING THE SIZE OF AN ORIGINAL IMAGE, SUCH AS IN A DIGITAL COPIER

(75) Inventors: Xing Li, Webster, NY (US); Ramesh Nagarajan, Pittsford, NY (US); Ammal Z. Malik, Webster, NY (US)

(73) Assignee: Xerox Corporation, Norwalk, CT (US)

( * ) Notice: Subject to any disclaimer, the term of this patent is extended or adjusted under 35 U.S.C. 154(b) by 834 days.

(21) Appl. No.: 10/401,340

(22) Filed: Mar. 27, 2003

(65) Prior Publication Data

US 2004/0190072 A1  Sep. 30, 2004

(51) Int. Cl.
*H04N 1/40* (2006.01)
(52) U.S. Cl. .................. 358/3.22; 358/448; 358/449; 358/528; 358/538; 358/453; 358/462; 358/488; 358/464
(58) Field of Classification Search ............ 358/3.22, 358/449, 448, 528, 538, 453, 462, 488, 464
See application file for complete search history.

(56) References Cited

U.S. PATENT DOCUMENTS

| | | | | | |
|---|---|---|---|---|---|
| 4,275,450 | A | * | 6/1981 | Potter | 382/298 |
| 4,366,508 | A | * | 12/1982 | Crean et al. | 358/451 |
| 4,439,790 | A | * | 3/1984 | Yoshida | 358/449 |
| 4,554,592 | A | * | 11/1985 | Yoshida | 358/449 |
| 4,587,621 | A | * | 5/1986 | DuVall | 355/55 |
| 4,686,577 | A | * | 8/1987 | Arimoto | 358/449 |
| 4,686,580 | A | * | 8/1987 | Kato et al. | 358/451 |
| 4,811,047 | A | * | 3/1989 | Hosaka et al. | 399/14 |
| 5,053,885 | A | * | 10/1991 | Telle | 358/449 |
| 5,097,519 | A | * | 3/1992 | Sugiura | 382/298 |
| 5,150,224 | A | * | 9/1992 | Mizude et al. | 358/449 |
| 5,198,853 | A | * | 3/1993 | Ichihara et al. | 399/16 |
| 5,327,261 | A | * | 7/1994 | Hirota et al. | 358/449 |
| 5,337,164 | A | * | 8/1994 | Yabe et al. | 358/487 |
| 5,353,130 | A | * | 10/1994 | Hasegawa | 358/530 |
| 5,583,659 | A | * | 12/1996 | Lee et al. | 358/3.13 |
| 5,592,573 | A | | 1/1997 | Eisenbarth et al. | 382/294 |
| 5,610,728 | A | * | 3/1997 | Sobue | 358/449 |
| 5,940,544 | A | | 8/1999 | Nako | 382/293 |
| 5,946,527 | A | | 8/1999 | Salgado et al. | 399/82 |
| 5,960,371 | A | * | 9/1999 | Saito et al. | 702/11 |
| 5,969,371 | A | | 10/1999 | Andersen et al. | 250/559.15 |
| 5,973,797 | A | * | 10/1999 | Tanaka et al. | 358/488 |
| 6,075,623 | A | * | 6/2000 | Yun | 358/486 |
| 6,266,512 | B1 | | 7/2001 | de Koning et al. | 399/370 |

(Continued)

FOREIGN PATENT DOCUMENTS

EP  0889634 A2  1/1999

*Primary Examiner*—Twyler L Haskins
*Assistant Examiner*—Jacky X Zheng
(74) *Attorney, Agent, or Firm*—Ronald E. Prass, Jr.; Prass LLP

(57) ABSTRACT

An input scanner, such as used in a digital copier, accepts original documents on sheets of any number of possible sizes within a single job. The video output of the scanner is applied to an algorithm to determine the length, along a process direction, of useful image data on each sheet. From such a determination, a size of output copy sheets can be automatically selected, or the image can be automatically changed in size in subsequent processing. A prescan of the original documents is not required.

7 Claims, 3 Drawing Sheets

U.S. PATENT DOCUMENTS

| | | |
|---|---|---|
| 6,313,928 B1 * | 11/2001 | Yu .............................. 358/488 |
| 6,323,963 B1 * | 11/2001 | Takahashi ................... 358/474 |
| 6,430,320 B1 | 8/2002 | Jia et al. ..................... 382/289 |
| 6,744,536 B2 * | 6/2004 | Buchar et al. ............... 358/464 |
| 6,744,540 B1 * | 6/2004 | Masuda et al. .............. 358/488 |
| 6,839,155 B2 * | 1/2005 | Spencer ...................... 358/488 |
| 7,006,263 B2 * | 2/2006 | Takahashi ................... 358/474 |
| 2002/0033973 A1 * | 3/2002 | Dolan et al. ................ 358/449 |

* cited by examiner

SYSTEM FOR DETERMINING THE SIZE OF AN ORIGINAL IMAGE, SUCH AS IN A DIGITAL COPIER

TECHNICAL FIELD

The present disclosure relates to the digital scanning or recording of original images on sheets, as would be found, for example, in a digital copier, facsimile, or multifunction machine.

BACKGROUND

Digital scanning, or the recording of original images on sheets as digital image data, is familiar in the art of office equipment. In the case of a digital copier, facsimile, or other multifunction machine, a stack of sheets bearing images to be recorded as digital data (for subsequent printing as copies, or for facsimile or e-mail transmission) is loaded into the tray of a document handler, and then one sheet at a time is drawn therefrom and caused to move relative to an image sensor. Such an image sensor typically includes one or more linear arrays of photosensors, each photosensor recording the reflected light from a series of small areas in the original image as the image moves therepast, yielding a set of digital signals.

As a practical matter, the scanning of original images involves certain considerations to provide a satisfactory result. One set of considerations involves taking into account the size of the original documents being scanned. In a copying or faxing context, the size of the originals must be known or assumed so that resulting prints based on the data, such as copies or received faxes, are made on suitably-sized print sheets. As needed, the scanned image data may be reduced or enlarged (with software or hardware actions performed on the image data) so that the images are placed on a copy sheet of a known size. There is therefore a need to establish the size of the original sheets, and this is typically done either by having the user directly or indirectly enter the original size through a user interface, or by the copier or other machine accepting a signal related to the size of the stack, such as from a movable guide associated with the document handler.

A more complicated situation results from "mixed-size original" situations, where the stack associated with a single scanning or copying job includes sheets of two or more sizes. In such a case, individual sheets in the stack would each have different image sizes and therefore different optimal ways of handling each image, such as deciding whether or not to alter the size of the image in a subsequent copy.

PRIOR ART

U.S. Pat. No. 5,946,527 discloses a system for addressing a "mixed-size original" situation in the context of a digital copier. Physical sensors of various possible types are used to establish certain dimensions of each sheet. Optionally, a user can select a "prescan document size sensing operational mode." Being a "prescan," however, means that the originals are scanned at least twice, once for size determination and once again for the actual recording of the images thereon.

U.S. Pat. No. 6,266,512 discloses a system, within a digital copier, for automatically determining a "best" copy sheet size given a determined size of the original image. The system can reduce or enlarge, and even rotate or center, original images to fit a copy sheet of a given size.

SUMMARY OF THE INVENTION

According to one aspect of the present invention, there is provided a method of determining a size of an image associated with a set of digital image data, the image data comprising a plurality of scanlines, each scanline comprising a plurality of pixels, each pixel having a luminance associated therewith. An amount of luminance change activity among a plurality of pixels in a scanline is determined. If the luminance change activity for the scanline exceeds a predetermined threshold, a scanline number register is updated. A dimension of the image is determined based on a value of the scanline number register.

According to another aspect of the present invention, there is provided a method of determining a size of an image associated with a set of digital image data, the image data comprising a plurality of scanlines, each scanline comprising a plurality of pixels, each pixel having a luminance associated therewith. For each pixel of a plurality of pixels in a scanline, a pixel difference counter is incremented if a luminance difference of the pixel relative to a second pixel in the scanline exceeds a predetermined luminance difference threshold. For each pixel of a plurality of pixels in a scanline, a line difference counter is incremented if a luminance difference of the pixel relative to a corresponding pixel in a substantially corresponding position in a second scanline exceeds a predetermined luminance difference threshold. For each scanline, a scanline number register is updated if the pixel difference counter is within a predetermined pixel difference counter range or the line difference counter is within a predetermined line difference counter range. A dimension of the image is determined based on a value of the scanline number counter.

DETAILED DESCRIPTION

Figure 1:
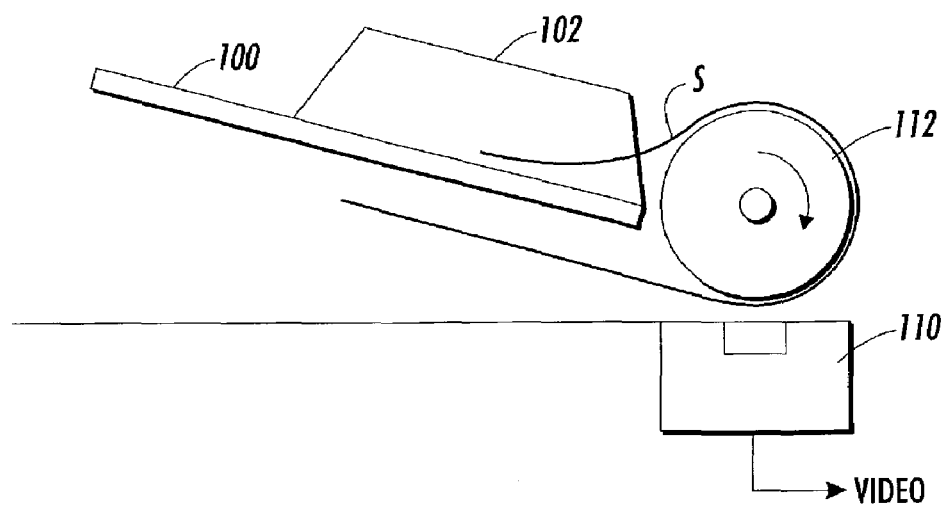
FIG. 1 is a simplified diagram of the basic elements of a digital input scanner, as would be found in a digital copier, scanner, or multifunction machine.

FIG. 1 is a simplified diagram of the basic elements of a digital input scanner, as would be found in a digital copier, scanner, or multifunction machine. (A more detailed description of an input scanner with platen and document handler, such as one capable of two-sided scanning, can be seen in the '527 patent referenced above.) An image-bearing sheet such as S originates, perhaps as part of a larger stack of sheets, on a tray 100, which may also include a movable side guide 102. The sheet S is drawn from the stack or the tray and caused to move past a photosensor array 110. The photosensor array 110 includes one or more linear arrays of photosensors, which record reflected light from each of a series of small areas on sheet S as the sheet moves therepast, and outputs a video stream. In a typical design, adjacent to the photosensors, opposite the sheet S, is a backing bar or roller, such as 112; as will be noted below, the backing 112 can provide useful optical contrast with the sheet S.

The photosensor array 110 may be of a size comparable to the width of sheet S as shown, or may be smaller and receive light from the sheet S through reductive optics. In a full-color scanning system, the video stream typically originates as RGB signals, but is usually converted to L*a*b* (luminance and chroma) space for subsequent processing.

Figure 2:
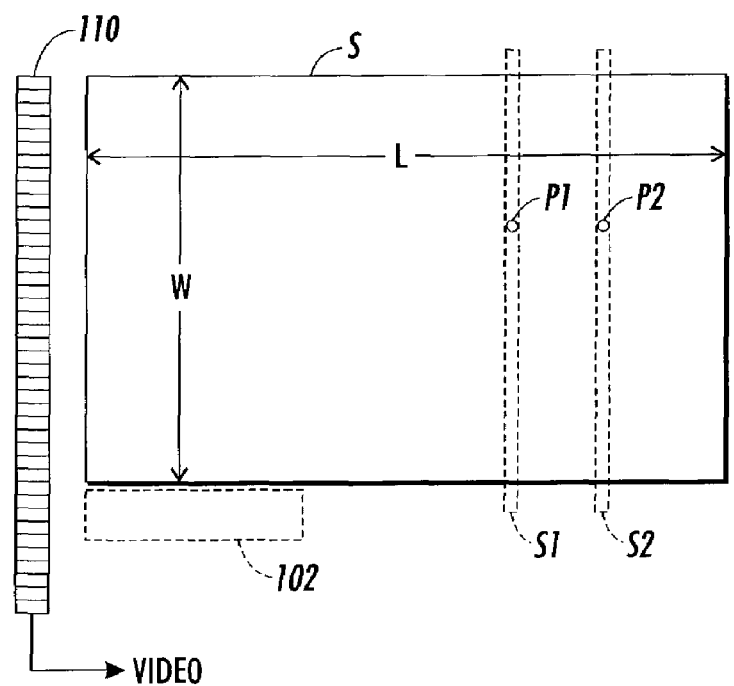
FIG. 2 is a diagram showing the parameters of a sheet being input into a digital input scanner.

FIG. 2 is a diagram showing the parameters of a sheet S being input into a digital input scanner, to illustrate certain concepts related to the method which will be described in detail below. The sheet S moves relative to the photosensor array 110. The sheet S has a width W, which will be considered the dimension of the sheet parallel to the array 110, and a length L, which corresponds to a distance the sheet must travel over the array 110 in order to record the image thereon. In some embodiments, the guide 102 is movable to contact a stack of sheets at the width of the widest sheet in the stack; in some cases, the position of guide 102 can be associated with a signal which is used in subsequent processing of scanned image data. It should be noted that this embodiment is indifferent to whether the width W is shorter or longer than length L, i.e., whether the scanning is "long-edge feed" or "short-edge feed" or the image is "portrait" or "landscape."

Also shown in FIG. 2 are representative "scanlines," such as S1 and S2. Each scanline comprises a set of pixels, such as P1 and P2. As used herein, a pixel is a video signal based on light from one small area of the image impinging on one photosensor and a scanline is a set of video signals based on an output of the photosensor array 110 at essentially one time. Thus, for recording an entire two-dimensional image, the video output comprises a series of scanlines, each scanline being in effect a one-dimensional "slice" of image data.

Figure 3:
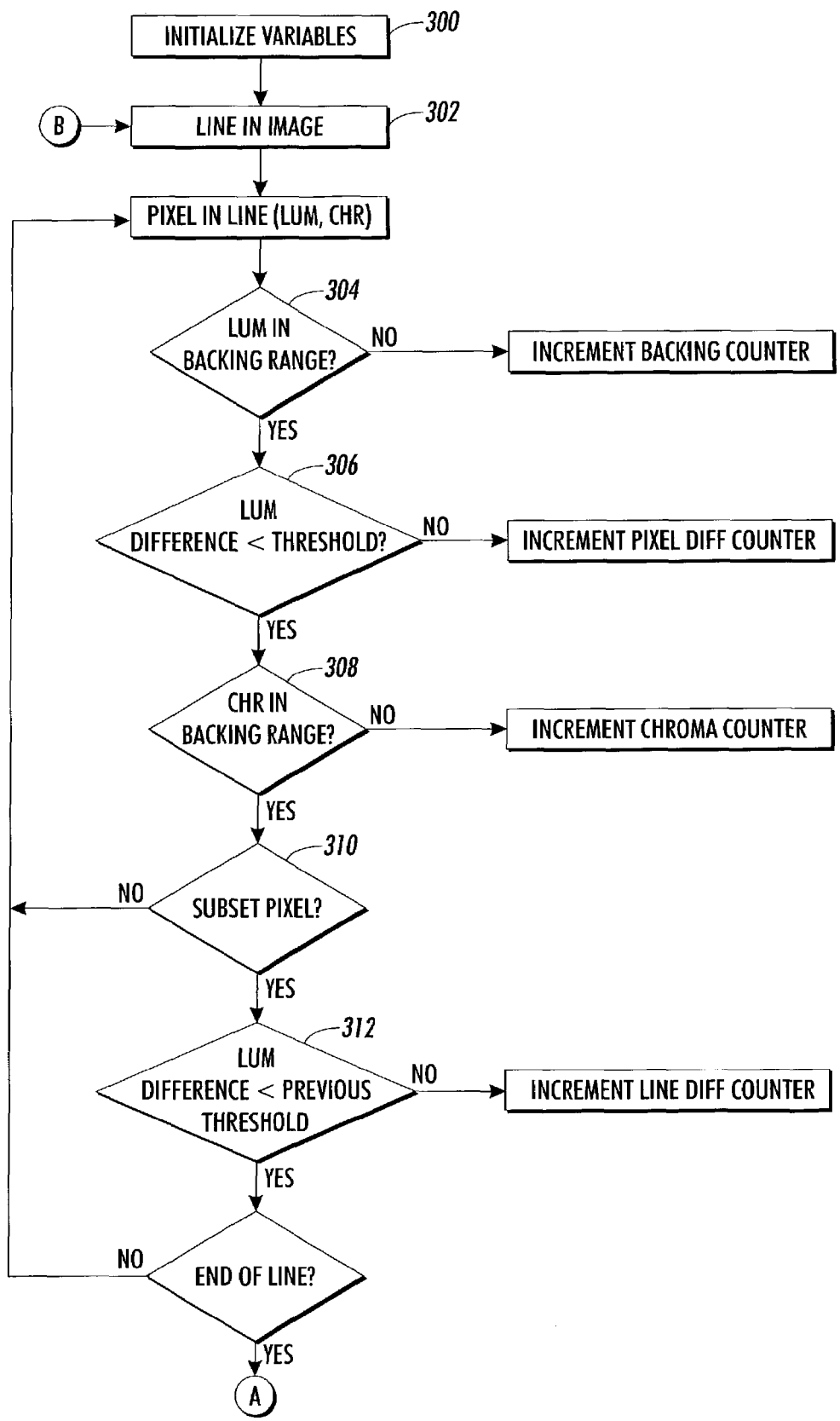
FIGS. 3 and 4 are flowcharts showing an embodiment of a method for determining the size of an original image being recorded with a scanner.
Figure 4:
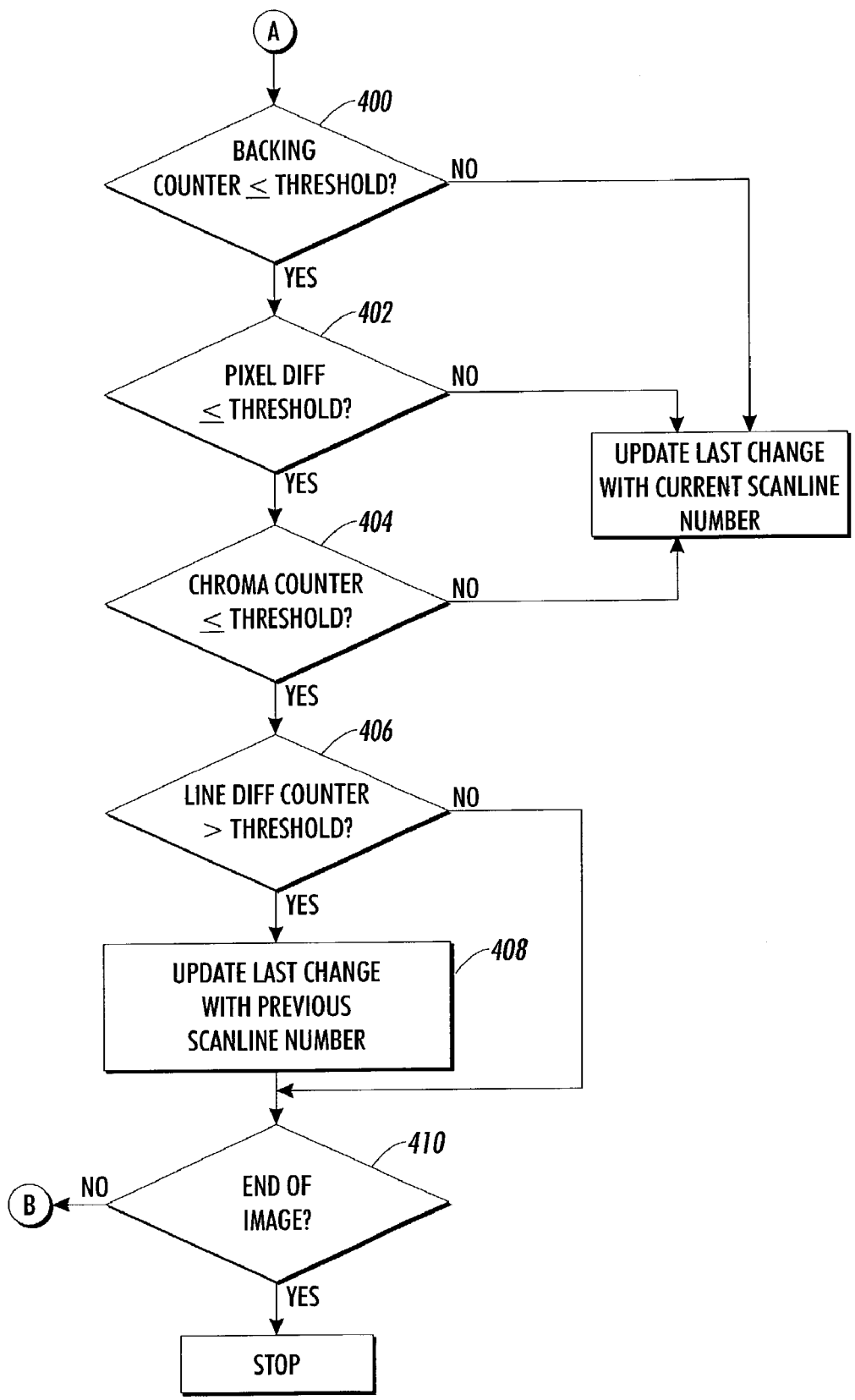

FIGS. 3 and 4 are flowcharts showing an embodiment of a method for determining the size of an original image being recorded with a scanner. The input to the method is the video stream of luminance and chroma signals, one pixel at a time forming a scanline, and then one scanline at a time. The method can be employed "on the fly," while image data is being recorded into a memory or shortly thereafter, in a manner which avoids the need for a prescan to determine an image size. The general output of the method is a number relating to the number of scanlines of useful image data which are being recorded, from which a length L of the sheet S can be calculated or deduced.

In the following description, which is a more detailed description of the method shown in the Figures, variable names are in italics. The parameters startLine, startPixel, endPixel, minBacking, maxBacking, pixelDiffThresh, pixelDiffCounter, lastchange, chroma ThreshHigh, chroma ThreshLow, iMax, lineDiffThresh, backingCountThresh, pixelCountThresh, chromaCountThresh, lineDiffCountThresh, and endLine are programmable, and can be finely adjusted for optimal performance. The text gives a detailed implementation and commentary to the corresponding steps in the Figures.

Start from scanline number startLine and do the following for each line:

Step 300: Initialize lineDiffCounter, chromaCounter, backingCounter and pixelDiffCounter Step 302: For a scanline in the image, and for each pixel in a scanline from startPixel to endPixel:

Step 304: If the luminance is not in range [minBacking, maxBacking], increment backingCounter. In effect, this step makes a determination whether the pixel is probably associated with the sheet S or the backing such as 112 in FIG. 1, by checking whether the luminance is in a range close to that associated with backing 112.

Step 306: If the luminance difference between the current and the previous pixel in the scanline is greater than pixelDiffThresh for a predetermined number of pixels in the scanline, then a counter variable called pixelDiffCounter is recorded for that line. Significant changes in luminance among pixels in a scanline are correlative of useful image data such as text. If there are significant pixel-to-pixel luminance changes along the scanline, one is likely to be "looking at" image data in that scanline.

At some point, a useful chroma value of the pixel is calculated. Some approximation could be used in calculating chroma. For example: chroma =max(|c1|, |c2|)+min(|c1|, |c2|)/2, where c1 and c2 are two chrominance channels such as $a^*$ and $b^*$ in CIELAB or Cb and Cr in YCbCr. This chroma is then used to determine the presence of a useful image.

Step 308: If chroma>chromaThreshHigh or chroma<=chromaThreshLow, increment chromaCounter. The purpose of this step is to determine whether the chroma of the pixel is consistent with that of the backing. If the chroma is not close to or consistent with the backing, the chromaCounter is incremented, for use later.

The following set of steps are, in this embodiment, carried out only on an evenly-spaced subset of pixels along a scanline. The subset of pixels can be selected, such as at step 310, for instance each pixel location defined as j ($j=N*(i+1)$, $i=0, 1, \ldots, iMax$,) where N is a fixed number, for example, 64, so that every $64^{th}$ pixel in the scanline is subjected to the step. However, it is conceivable that the steps can be carried out on all or some otherwise-selected subset of pixels in the scanline.

If the pixel in question is identified as a subset pixel, then the luminance of the pixel is compared to the luminance of another pixel at a same or similar location in another scanline, and a counter is incremented if the difference in luminance exceeds a threshold amount, as shown at step 312. In algorithmic form, if |lumiCurrent−lumi[i]|>lineDiffThresh| increment lineDiffCounter, where LumiCurrent is the luminance of the current pixel and lumi,[i] is the luminance of the pixel from a previous scanline at the same scanline location. The "previous scanline" could be an immediately adjacent scanline, or a scanline spaced a predetermined distance away from the scanline under consideration. The value of lumiCurrent can be stored to lumi[i] for later use in analyzing another scanline.

After all of the pixels in a given scanline have been analyzed as in the FIG. 3 steps, the various "counter" variables which may have been variously incremented are then monitored, as shown in the steps of FIG. 4, for that scanline to determine a result. The general idea is to record the last scanline that has some "activity," by updating the variable lastchange with each scanline showing activity, and use that to determine the paper length.

With reference to FIG. 4, steps 400-404 show comparisons of the various counters at the end of the scanline: check if backingCounter<=backingCountThresh, and pixelDiffCounter<=pixelCountThresh and chromaCounter<=chromaCountThresh. If these conditions do not hold, then update lastchange with the current scanline number. Otherwise, at step 406, if lineDiffCounter>lineDiffCountThresh then lastChange is updated with the previous scanline number, as at step 408. Therefore, the value of lastchange at any given time is the number of the last recorded scanline to exhibit the threshold amount of activity consistent with a meaningful image: the variable lastChange thus acts as a scanline number register. The last updated value of lastChange will correspond to the line number (and thus position) of the end of meaningful image data, and therefore relate to the size of the image being recorded.

The steps of FIGS. 3 and 4 are repeated for the video stream until endLine (which specifies the range of detection, i.e., the maximum expected length of the incoming image) and the final lastchange is reported. The steps repeat for each scanline in the image, as shown by returning to step 302. At the end of the image, such as determined by a lack of activity at step 410, lastChange will contain the scanline number register of the last scanline of meaningful image data in the scanned document. This information can be used to crop the image appropriately (such as including a margin of predetermined size) and send the determined image size to further software and hardware in a larger system, such as within a digital copier.

In one alternate embodiment, a purely monochrome system could be provided, and the above-described steps involving chroma of input images can be skipped. In other alternate embodiments, instead of using every pixel in a scanline for analysis, a predetermined subset of pixels, or sets of pixels, or a moving average of values of pixels in each scanline is analyzed; such systems may achieve satisfactory results with fewer calculations.

Although the present embodiment is shown and described in the context of scanning in an original image with an automatic document handler, the methods described herein can readily be applied to an image being recorded from a stationary platen, or to image data previously stored in a memory.

The invention claimed is:

1. A method of determining a size of an image associated with a set of digital image data, the image data comprising a plurality of scanlines, each scanline comprising a plurality of pixels, each pixel having a luminance associated therewith, the method comprising:
    scanning an original image on a sheet, thereby obtaining a set of image data comprising a plurality of scanlines, each scanline comprising a plurality of pixels;
    for each pixel of a plurality of pixels in a scanline, incrementing a pixel difference counter if a luminance difference of the pixel relative to a second pixel in the scanline exceeds a predetermined luminance difference threshold;
    for each pixel of a plurality of pixels in a scanline, incrementing a line difference counter if a luminance difference of the pixel relative to a corresponding pixel in a corresponding position in a second scanline exceeds a predetermined luminance difference threshold;
    for each scanline, updating a scanline number register if the pixel difference counter is within a predetermined pixel difference counter range or the line difference counter is within a predetermined line difference counter range;
    determining a dimension of the original image based on a value of the scanline number register; and
    printing an image derived from the original image, using a determined dimension of the original image.

2. The method of claim 1, further comprising
    for each of a plurality of scanlines, not updating the scanline number register if a plurality of pixels in the scanline are in a predetermined range of luminance consistent with a backing.

3. The method of claim 2, further comprising
    using chroma values for the plurality of scanlines to determine if the plurality of pixels in the scanline in a predetermined range of luminance consistent with a backing.

4. The method of claim 1, wherein each pixel has a chroma value associated therewith and the method further comprising:
    for a pixel in a scanline, determining if the chroma value of the pixel is within a predetermined range.

5. The method of claim 1, wherein each pixel has a chroma value associated therewith and the method further comprising
    for each pixel of a plurality of pixels in a scanline, incrementing a chroma counter if the chroma value of the pixel is not within a predetermined chroma range.

6. The method of claim 5, wherein the predetermined chroma range is related to a color of a backing used in recording the digital image data from an original image.

7. The method of claim 1, further comprising
    for each scanline, updating the scanline number register if the chroma counter is within a predetermined chroma counter range.

* * * * *